(No Model.)
J. C. PENNINGTON.
PROCESS OF MAKING BEER.
No. 515,011. Patented Feb. 20, 1894.
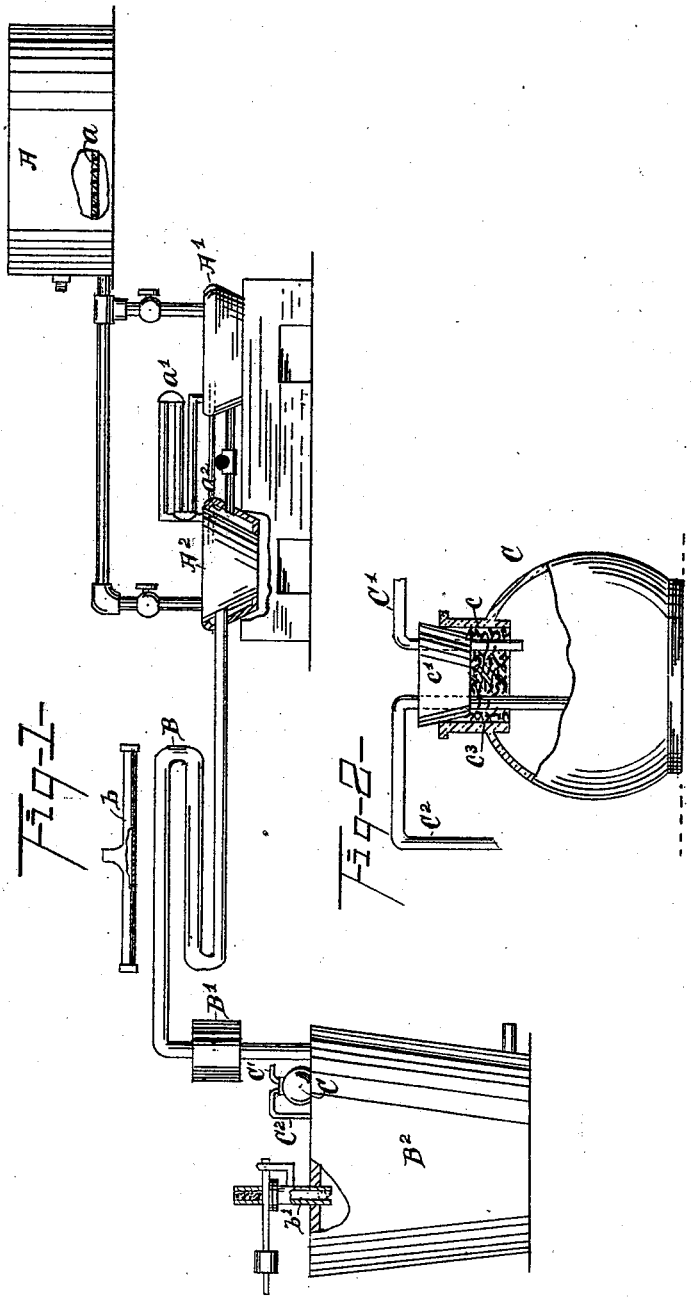
WITNESSES:
William A. Pollock
David N. Mason
INVENTOR
John C. Pennington
BY
William C. Dugery
his ATTORNEY

UNITED STATES PATENT OFFICE.

JOHN C. PENNINGTON, OF PATERSON, NEW JERSEY.

PROCESS OF MAKING BEER.

SPECIFICATION forming part of Letters Patent No. 515,011, dated February 20, 1894.

Application filed May 24, 1892. Serial No. 434,167. (No specimens.)

*To all whom it may concern:*

Be it known that I, JOHN C. PENNINGTON, of Paterson, in the county of Passaic and State of New Jersey, have invented a new and useful Improvement in Processes of Making Beers, of which the following is a specification, reference being had to the accompanying drawings.

This invention relates to improvement in processes of making beers.

The object is to produce a beer free from spores, germs, ferments, or microbes productive of extra or spurious fermentation deleterious to its keeping and injurious to health.

With this object in view, the invention resides in the process of making beer, which consists in producing a suitable wort, then sterilizing this wort by alternate heating and cooling, after mashing, and then sowing the sterilized wort with pure yeast, the entire procedure being conducted with exclusion of extraneous spores and germs; finally, the invention resides in the process of making beer, which consists, first, in heating the wort two or more times in closed vessels, after mashing, at intervals of from six to twelve hours, to about the boiling point, cooling it between each heating to thoroughly sterilize it, and then sowing it with pure yeast, all under exclusion of extraneous spores and germs.

As an illustration of how my process may be carried into effect, the following will serve as an example, where a pure beer is to be made: I make a mash in the ordinary manner with malt alone, or with malt with any suitable grain. The wort is placed in a closed vessel containing a suitable quantity of hops, and, if desired, other well-known flavoring matter. The vessel used is of a strength sufficient to withstand considerable pressure. The wort is heated to about the boiling point. It is then transferred, without exposure to outside air, to a vessel closed against access of spores or germs from without, where it is left a suitable time to allow any spores to germinate, say for from six to twelve hours. It is then again heated to about the boiling point to destroy any existing germs, and is then passed, without exposure, as before, through a cooling apparatus into fermenting tuns also closed against access of any spores or germs. Should this second heating, in any exceptional case, not prove sufficient, the operation of heating and cooling, with careful exclusion of spores and germs, may be repeated. The fermenting tun is provided with a closed top or cover; but, in order that carbonic acid gas may, under desired pressure, escape, a pipe provided with a safety-valve is placed in the top of the tun, the pipe being preferably packed with cotton or substance having a similar germ-excluding function. It is possible that, at any stage, during the heating of the liquid, extraneous spores and germs, that is to say, spores and germs from the outside air might be, so to speak, negatively, excluded, by the repellent action of the vapors or steam coming off and without closely covering the liquid; but it is especially important, during the cooling of the liquid for the germination of any residual spores, that outside or extraneous air should be positively excluded. The point is to prevent any access of any fresh spores or germs at any stage of the operation by whatever means this may be effected; and the invention is broadly in sterilizing wort and making pure beer by repeated heating and cooling of the wort while any access of outside spores or germs is prevented in any manner, and sowing the wort with a small quantity of pure yeast with exclusion of outside spores or germs, the yeast being preferably prepared by the process of my patent of May 13, 1879, No. 215,287.

A desirable feature is as follows: A suitable quantity of sterilized wort is placed in a vessel having a contracted mouth, the mouth being packed, at its lower end, with cotton or other suitable substance. A small quantity of the so-called "pedigree yeast," that is, yeast produced as described in the above-designated patent, is added and the whole is then ready for fermentation. When ready, the entire contents of the vessel are transferred into the sterilized wort within a suitable tun by any means which will protect the said contents from contact with the outer air and undesirable spores and germs.

The operation of the process is not dependent upon any specific apparatus; but, in order to illustrate the invention, I have shown in the accompanying drawings, one form of apparatus which may be used for the purpose.

Figure 1—is a diagrammatic view of the entire apparatus; and Fig. 2—is an enlarged detail view of a portion of the apparatus.

In the drawings, A represents a mash-tun provided with a false bottom $a$ through which false bottom the wort is run and forced through a suitable pipe into a kettle A'. This kettle A' is provided with a cover by which it can be tightly closed and the vessel is made sufficiently strong to withstand considerable pressure. The vessel A' is designed to contain the hops and other flavoring material and the wort, and is designed to hold this mixture while being heated to about the boiling point. After being heated, the same is passed through cooling pipes $a^2$, arranged adjacent to the kettle A' and thence into a kettle $A^2$ where it is allowed to remain at least six hours to enable any germs to germinate, after which, the second heating takes place in this kettle $A^2$. Cooling pipes B are connected to the kettle $A^2$ at one end, and to a fermenting tun $B^2$ at the other end, and these pipes may be cooled in any desirable manner, as, for instance, they may be surrounded by a perforated pipe, as $b$, through which water is ejected on the pipes B. The fermenting tun $B^2$ has a close cover to exclude the dust and other undesirable matter from the atmosphere and has extending through this cover, a pipe $b'$. This pipe is provided with a suitable safety valve, and, above this valve, is packed cotton or similar material, so that the carbonic acid gas may, under extreme pressure, escape, the special object being to keep the thoroughly sterilized beer in the tun from, in any way, receiving any spores or germs from the air.

The sowing of the wort is accomplished in a vessel, C, which vessel is provided with a mouth $c$ packed, in its lower end, with a quantity of cotton $c^3$. One end of the pipe $c^2$ extends into the vessel C, and the outer end of this pipe is projected through a hole in the top of the tun $B^2$. The wort is forced out of the vessel C into the tun $B^2$ by pressure, such as air-blast, or the like, through a tube $c'$.

Provision is made for sterilizing the apparatus by steam or other heat at proper intervals of time, introduced through the several vessels and pipes of the apparatus.

The object of heating the wort a number of times with intermediate cooling is thoroughly to sterilize it, that is to say, each heating kills germs which have developed but may not kill undeveloped spores, while the intermediate cooling allows any residual spores to germinate, the germinated spores being then killed by subsequent heating. The heat must be sufficiently high in degree, say about the boiling point, and be sufficiently long continued to kill the germinated spores, while the intermediate cooling must be of sufficient length, say from six to twelve hours, to permit the undeveloped spores to germinate without there being time enough for the growth or formation of new spores; and it is important that, during the whole procedure, no extraneous spores or germs shall get into the mixture.

It is well known, that ordinary beer is a mixture containing numerous ferments, among which are some capable of producing acids, and many other undesirable products, and also, that the air contains germs of a variety of ferments, bacteria, &c., whose office it is to purify and return to its elements all organic matter. I have found that the wort can be thoroughly sterilized by heating it twice or oftener at intervals of from six to twelve hours, because the germs are not killed by a single boiling heat while they are killed by that heat after germination. It will be seen, that by my procedure, a beer for direct consumption or for distillation is produced, which, having been freed from all microbes, germs, or ferments but the pure specific yeast desired, is one which can have no extra or spurious fermentation, presenting matter injurious to health and causing its deterioration; and, as a matter of fact, the beer thus produced will keep indefinitely, under any conditions of warmth, light, &c., if placed in proper vessels with exclusion of extraneous ferments.

Having thus described my invention and one form of apparatus for putting it into effect, what I claim as new, and desire to secure by Letters Patent, is—

1. The new process of making beer, which consists in producing a suitable wort, then thoroughly sterilizing this wort by alternate heating and cooling, and then sowing the sterilized wort with pure yeast, the entire procedure being conducted with exclusion of extraneous spores or germs, substantially as set forth.

2. The process of making beer, which consists in heating the wort two or more times to about the boiling point, at intervals of from six to twelve hours, cooling it between each heating under exclusion of extraneous spores or germs, and then sowing it with pure yeast under exclusion of other germ-matter, substantially as set forth.

In testimony whereof I have signed my name to this specification in the presence of two subscribing witnesses.

JOHN C. PENNINGTON.

Witnesses:
J. L. MITCHELL,
J. F. ROBINSON.